Oct. 2, 1923.
F. G. HUGHES
SHAFT COUPLING
Filed June 16, 1921
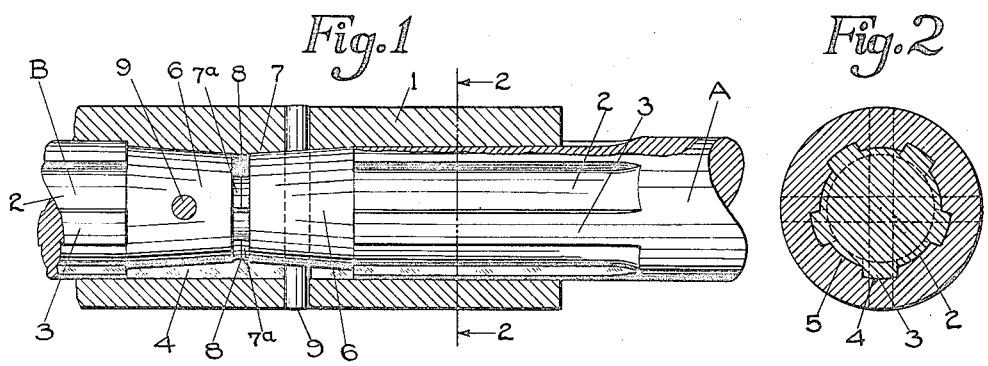
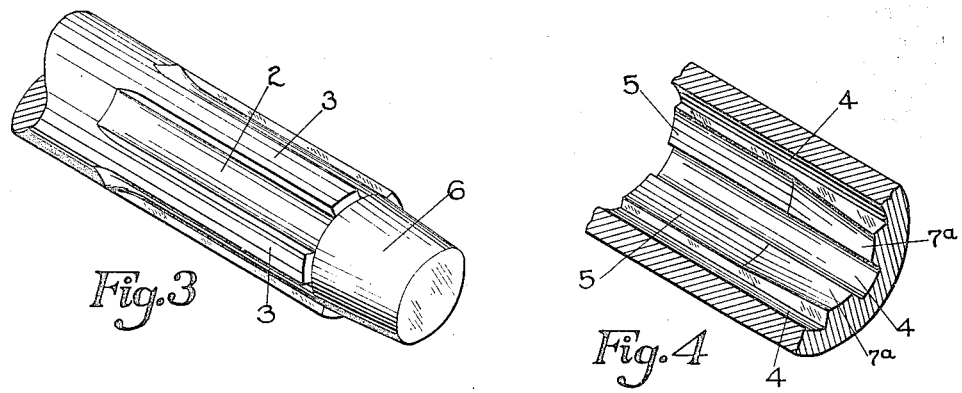
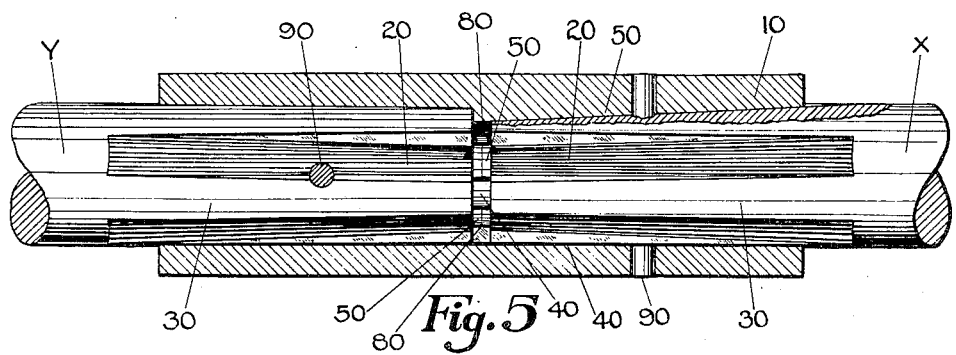
INVENTOR:
Frederick G. Hughes.
BY
ATTORNEY.

Patented Oct. 2, 1923.

1,469,304

UNITED STATES PATENT OFFICE.

FREDERICK G. HUGHES, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

SHAFT COUPLING.

Application filed June 16, 1921. Serial No. 477,971.

*To all whom it may concern:*

Be it known that I, FREDERICK G. HUGHES, a citizen of the United States, residing at Bristol, county of Hartford, State of Connecticut, have invented a certain new and useful Shaft Coupling, of which the following is a full, clear, and exact description, such as will enable others skilled in the art to which it appertains to make and use the same, reference being had to the accompanying drawings, forming part of this specification.

My invention relates to improvements in shaft couplings, and, although not limited to such use, is particularly adapted to couple shafts or shaft-sections of an automobile or the like.

My object is to provide a structure adapted to efficiently drive one part from the other and having the assembled parts so tightly and securely held together that play between parts is prevented and rattling and wear, and consequent loss of efficiency, are obviated.

To these ends, and also to improve generally upon devices of the character indicated, my invention consists in the various matters hereinafter described and claimed.

In the accompanying drawings: Figure 1 is a longitudinal view, partly in section; Figure 2 is a cross-section on about the line 2—2 of Figure 1, looking in the direction of the arrows; Figure 3 is a perspective of one of the shafts; Figure 4 is a perspective, partly in section, of a fragment of the coupling sleeve; and Figure 5 is a view generally similar to Figure 1 but showing a modification.

In the illustrated embodiment of my invention A and B indicate shafts to be connected (as for example, the shaft driven by the engine of a motor car and the shaft transmitting the power to the usual wheel shafts), while 1 is a coupling sleeve. The shafts are provided with longitudinal channels 2 which produce intermediate longitudinal ribs or splines 3, and corresponding longitudinal channels 4 and ribs or splines 5 are provided in the sleeve 1, these latter-mentioned channels extending through the sleeve from end to end, and the sleeve-channels snugly receiving the shaft ribs while the shaft-channels snugly receive the sleeve ribs, so that, through the sleeve, torque is transmitted from one shaft to the other. Also, wedging connection is provided between the shafts and the sleeve, so that looseness between these elements is prevented and there is thus obviated wear upon the splines due to striking or moving of one against the other thereof.

In the form shown in Figures 1 to 4, inclusive, each shaft-end is tapered into a truncated cone 6 whose smaller diameter is the extremity of the shaft while its larger diameter corresponds with the shaft diameter at the bottoms of the channels 2. The ribs or splines 3 stop at this larger side of the tapered shaft-end 6. The sleeve 1 has a thickened central portion 7 whose middle diameter, 8, is less than the smaller diameter of the tapered shaft-ends, and whose bore flares outwardly in both directions from its middle and upon a slant corresponding to that of the shaft-ends 6, so that tapered sockets are thus provided for these shaft-ends. The sleeve channels 4, however, extend through the central portion 7 with the channel bottoms on a line with those portions of the channel bottoms in the end portions of the sleeve, so that, not only can these sleeve channels be produced by a single, straight cut of a proper machine-tool, but also, as the shaft-channels 2 are elongated beyond the ends of the sleeve, no obstruction is presented to the splines as the shafts move inwardy in the sleeve, and thus, notwithstanding the splines, the shafts can be forced into the sleeve until the tapered ends 6 are firmly seated and wedged into the tapered sockets 7ª, so that the parts are thus firmly held against relative lateral play. Preferably, after the shafts are firmly wedged into the sleeve they are further secured in position, and fastened against relative longitudinal movement, by pins 9 driven through the sleeve and the shaft-ends, these pins being desirably driven at right angles to each other whereby undue weakening of the sleeve is guarded against.

By making the tapered portion the end of the shaft and locating the splines upon the shaft's body portion, the shaft is not weakened by reduction for the taper, the splined, driving, body portion of the shaft remaining of unimpaired strength notwithstanding provision of a tapered portion.

In the form shown by Figure 5 the structure is similar to that already described except that instead of providing the plain tapered shaft-ends 6, the shafts, X, Y, are of the same diameter throughout their whole portions which cooperate with the sleeve 10 and the channel bottoms 20 of the shafts incline upwardly from the extremity of the shaft to a point beyond that which the sleeve-end can occupy when the parts are assembled; while the sleeve-ribs 50 are correspondingly inclined from the sleeve ends inwardly to the middle of the sleeve, the diameter, 80, at the plane at which the ribs meet being less than the smallest diameter of the shafts. In this way long tapered sockets are provided in the sleeve for the tapered portions of the shafts, so that, the bottoms of the sleeve channels 40 extending straight from end to end of the sleeve as explained in connection with the channels 4, the shafts can be wedged tightly into the sleeve notwithstanding the splines, 30 of the shafts and 50 of the sleeve. Pins 90 are preferably driven through the sleeve and shafts for the purpose previously indicated.

Thus in my coupling positive driving is insured through the splines but notwithstanding these splines the shafts are firmly wedged into the sleeves so that, even under vibration, lateral movement between the sleeve and the shafts is prevented while relative longitudinal movement is also prevented by the pins, the result being that my structure affords powerful and positive spline-drive without rattling and consequent wear of the splines and ultimate deterioration of the driving efficiency.

I claim:

1. In a device of the character indicated, a sleeve and a shaft, each provided with cooperating splines, said shaft having a tapered portion and said sleeve having a cooperating tapered socket, the said splines of the shaft being upon the body-portion of the latter and the said tapered portion of said shaft extending beyond said body portion; substantially as described.

2. In a device of the character indicated, a shaft having splines upon its body portion, and also having its end beyond said body portion tapered, and a sleeve having cooperating splines and also having a tapered socket cooperating with said tapered end of said shaft; substantially as described.

3. In a shaft coupling, a sleeve having a tapered socket, longitudinal ribs upon said sleeve and separated by grooves, a shaft having a tapered portion, and longitudinal ribs upon said shaft adapted to be received into the said grooves of said sleeve and separated by grooves adapted to receive the said ribs of said sleeve, the bore of said sleeve being free from obstruction to the passage of said tapered portion of the shaft to a wedging seat in said socket, and the said grooves of said sleeve and shaft extending respectively beyond the points occupied by the ends of the ribs received in them when the said shaft is thus wedged in said socket; substantially as described.

4. In a shaft coupling, a coupling sleeve having a pair of sockets tapering inwardly toward each other, longitudinal ribs upon said sleeve and having grooves between, a pair of shafts provided with tapered portions wedgingly received in said sockets, and longitudinal ribs upon said shafts and received in said grooves of said sleeve and separated by grooves which receive said ribs of said sleeve, said shafts being of such length that they are out of engagement with each other when seated in said sockets, and the said grooves of said sleeve and shafts extending respectively beyond the ends of the ribs received in them when the said shafts are so seated; substantially as described.

5. In a shaft coupling, a sleeve provided with longitudinal splines and having a tapered socket beyond which the said splines extend, a shaft having a tapered portion adapted to seat in said socket, and splines upon said shaft terminating before entering upon said tapered portion of the shaft and adapted to cooperate with the splines of said sleeve; substantially as described.

In testimony whereof I hereunto affix my signature.

FREDERICK G. HUGHES.